Figure 1:
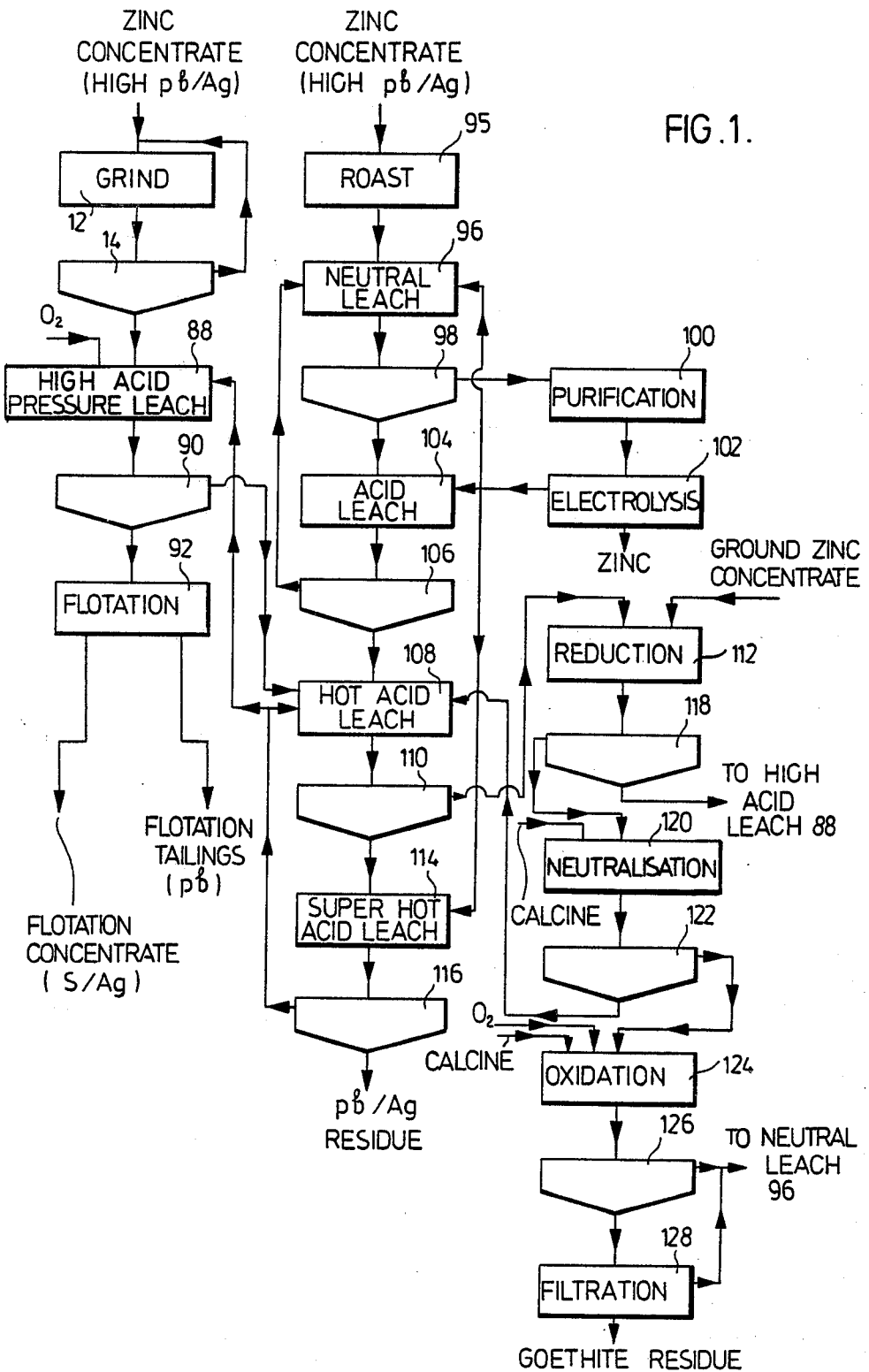

United States Patent [19]

Weir et al.

[11] 4,440,569

[45] Apr. 3, 1984

[54] RECOVERY OF ZINC FROM ZINC-CONTAINING SULPHIDIC MATERIAL

[75] Inventors: Donald R. Weir; Ian M. Master, both of Fort Saskatchewan, Canada

[73] Assignee: Sherritt Gordon Mines Limited, Toronto, Canada

[21] Appl. No.: 468,740

[22] Filed: Feb. 22, 1983

[30] Foreign Application Priority Data

Feb. 24, 1982 [GB] United Kingdom ................ 8205495

[51] Int. Cl.³ ..................... C22B 19/00; C22B 15/00; C22B 11/00; C01G 49/02
[52] U.S. Cl. .................................. 75/120; 75/101 R; 75/108; 75/118 R; 423/41; 423/92; 423/98; 423/106; 423/109; 423/146; 423/150; 423/578 A; 204/119; 204/120
[58] Field of Search ..................... 423/92, 95, 98, 106, 423/109, 146, 150, 41, 578 A; 75/120, 118 R, 101 R, 108, 86; 204/119, 120

[56] References Cited

U.S. PATENT DOCUMENTS 3,143,486 10/1961 Pickering et al. ..................... 75/120
4,128,617 12/1978 DeGuire et al. ..................... 423/109

OTHER PUBLICATIONS

"Tests on the Autoclave Leaching of Zinc Cokes" Babadzhan, A. A. Tsvetnye Metally, vol. 38 #5 Russ., vol. 6 #5 Eng., pp. 31-34.

Primary Examiner—Edward J. Meros
Assistant Examiner—Robert L. Stoll
Attorney, Agent, or Firm—Robert F. Delbridge; Arne I. Fors

[57] ABSTRACT

A process for recovering zinc from zinc containing sulphidic material which also contains iron together with lead and/or silver includes leaching the material under oxidizing conditions at a temperature in the range of from about 130° to about 170° C. in aqueous sulphuric acid solution with a stoichiometric excess of sulphuric acid relative to the zinc content of the material of from about 40 to about 100% to produce an undissolved residue containing a major proportion of lead and/or silver and a leach solution containing a major proportion of the zinc and iron. The residue is separated from the leach solution and treated to recover lead and/or silver values. The leach solution is treated to recover zinc by feeding the solution to another process in which zinc-containing material is treated to recover zinc and which includes an iron-precipitation step. The other process includes roasting zinc and iron containing sulphidic material to produce a zinc oxide and zinc ferrite containing material, which is then leached in a weak aqueous sulphuric acid solution to dissolve zinc oxide and produce a leach solution containing dissolved zinc and a zinc ferrite containing residue. The residue is separated from the leach solution. Zinc is recovered from the leach solution, and the zinc ferrite containing residue is leached in a strong aqueous sulphuric acid solution to dissolve zinc ferrite and produce a leach solution containing dissolved zinc and iron and a residue, with the strong aqueous sulphuric acid solution comprising at least a portion of the leach solution containing a major proportion of zinc and iron. The leach solution containing dissolved zinc and iron is separated from the residue. Ferric iron in the leach solution is reduced to ferrous iron, and the ferrous iron is neutralized and hydrolyzed under oxidizing conditions to precipitate an iron compound, and the iron compound is separated from the remaining solution.

6 Claims, 3 Drawing Figures

RECOVERY OF ZINC FROM ZINC-CONTAINING SULPHIDIC MATERIAL

This invention relates to the recovery of zinc from zinc-containing sulphidic material which also contains iron together with lead and/or silver.

It is known to recover zinc from zinc-containing sulphidic material by leaching the material under oxidizing conditions at elevated temperature in aqueous sulphuric acid solution to provide an undissolved residue and a leach solution containing dissolved zinc. After carrying out any necessary purification steps, the purified leach solution is electrolyzed to produce elemental zinc. Most zinc-containing sulphidic material usually also contains iron, and it is also known that the presence of iron is desirable because it assists the oxidation leaching of sulphidic material and hence assists in obtaining adequate dissolution of zinc. It is usual for the leach to be commenced with a slight stoichiometric excess of sulphuric acid relative to the amount of zinc in the zinc-containing material, for example with the molar ratio of sulphuric acid to zinc being about 1.1:1, that is to say with about 10% excess sulphuric acid.

However, with such a stoichiometric excess of acid, some iron is also dissolved, and thus is present in the leach solution. Because the subsequent zinc electrolysis step requires that the zinc-containing solution to be electrolyzed be substantially iron-free, it is necessary to remove iron in a purification step, even though the leach may be conducted in such a way that a minimal amount of iron is dissolved.

Zinc-containing sulphidic material may, in addition to iron, also contain lead and/or silver, and in some cases the lead and/or silver content may be sufficiently high to render recovery of one or both of these metals economically desirable. In zinc recovery processes such as described above, substantially all of the lead and/or silver remains in the leach together with most of the iron. The presence of iron in the residue complicates the subsequent recovery of lead and/or silver therefrom.

According to the present invention, zinc-containing sulphidic material which also contains iron together with lead and/or silver is leached under oxidizing conditions at a temperature in the range of from about 130° C. to about 170° C. in aqueous sulphuric acid solution with an initial substantial stoichiometric excess of sulphuric acid relative to the zinc content of the material, namely from about 40% to about 100% excess of sulphuric acid. It has been found that such an acid excess results in the dissolution of a substantial amount of iron as well as zinc but without any significant dissolution of lead and/or silver. Thus, the leach residue produced in accordance with the invention is relatively iron-free, so that the lead and/or silver content is much higher than before and the recovery of lead and/or silver from the leach residue is facilitated.

The leach solution containing dissolved zinc thus also contains a substantial amount of dissolved iron and free sulphuric acid. In accordance with the present invention, the leach solution is utilized in another zinc recovery process which incorporates an iron-precipitation step. This other zinc recovery process may be a conventional roast-leach process in which the zinc-containing sulphidic material is first roasted, with the resulting calcine being leached.

Expansion of an existing roast-leach plant using conventional technology would require additional roaster capacity and/or additional off gas handling capacity to handle the additional dust and sulphur dioxide production. Thus, expanding the roasting capacity would increase the sulphuric acid production, which is not desirable if a ready market for the acid does not exist. Expanding the plant by adding a pressure leach facility in accordance with the present invention will add additional zinc in solution and produce an elemental sulphur product (rather than sulphuric acid) which can be stored indefinitely for future acid production or sold for acid production elsewhere.

Another significant advantage of the present invention is that it enables the use of pressure leaching equipment to replace outdated roasting and acid plant equipment. Shutdown of old equipment may be required for technical, economic, or environmental reasons. Although the old equipment could be replaced with more modern roast and acid plant facilities, direct pressure leaching of zinc concentrate provides a more simple means of putting the zinc into solution since high zinc extraction is obtained in only one stage of leaching.

Thus, the other process may include roasting zinc and iron containing sulphidic material to produce a zinc oxide and zinc ferrite containing material, leaching the zinc oxide and zinc ferrite containing material in a weak aqueous sulphuric acid solution to dissolve zinc oxide and produce a leach solution containing dissolved zinc and a zinc ferrite containing residue, separating the residue from the leach solution, recovering zinc from the leach solution, leaching the zinc ferrite containing residue in a strong aqueous sulphuric acid solution to dissolve zinc ferrite and produce a leach solution containing dissolved zinc and iron and a residue, with the strong aqueous sulphuric acid solution comprising at least a portion of said leach solution containing a major proportion of zinc and iron, separating the leach solution containing dissolved zinc and iron from the residue, reducing ferric iron in the leach solution to ferrous iron, neutralizing and hydrolyzing the ferrous iron containing solution under oxidizing conditions to precipitate an iron compound, and separating the iron compound from the remaining solution.

The zinc and iron containing material to be roasted may also contain said at least one metal, and the residue obtained by leaching the zinc ferrite containing material in strong aqueous sulphuric acid solution also contains said at least one metal.

Values of said at least one metal obtained by treating the residue from leaching the first zinc and iron containing material with a stoichiometric excess of sulphuric acid may be added to the zinc ferrite containing material, whereby the residue obtained by leaching the zinc ferrite containing material also contains said at least one metal values from the first zinc and iron containing material.

The other process may also include leaching the residue in a further strong aqueous sulphuric acid solution to further dissolve zinc ferrite and produce a further residue containing said at least one metal and a zinc containing solution, separating the further residue from the leach solution, and supplying at least a portion of the leach solution to said leach with a stoichiometric excess of sulphuric acid.

Alternatively, the other process may include roasting zinc and iron containing sulphidic material to produce a zinc oxide and zinc ferrite containing material, leaching the zinc oxide and zinc ferrite containing material in a weak aqueous sulphuric acid solution to dissolve zinc oxide and produce a second leach solution containing dissolved zinc and a zinc ferrite containing second residue, separating zinc ferrite containing second residue from the second leach solution, recovering zinc from the second leach solution, supplying the zinc ferrite containing second residue to said leaching of the sulphidic material with a stoichiometric excess of sulphuric acid to cause dissolution of zinc ferrite and consequent further dissolved zinc and iron in said first leach solution, reducing ferric iron in the first leach solution to ferrous iron, neutralizing the solution and hydrolyzing the ferrous iron under oxidizing conditions to precipitate an iron compound, and separating the iron compound from the remaining solution. It will be readily appreciated that this procedure is considerably simpler than that described earlier.

Figure 2:
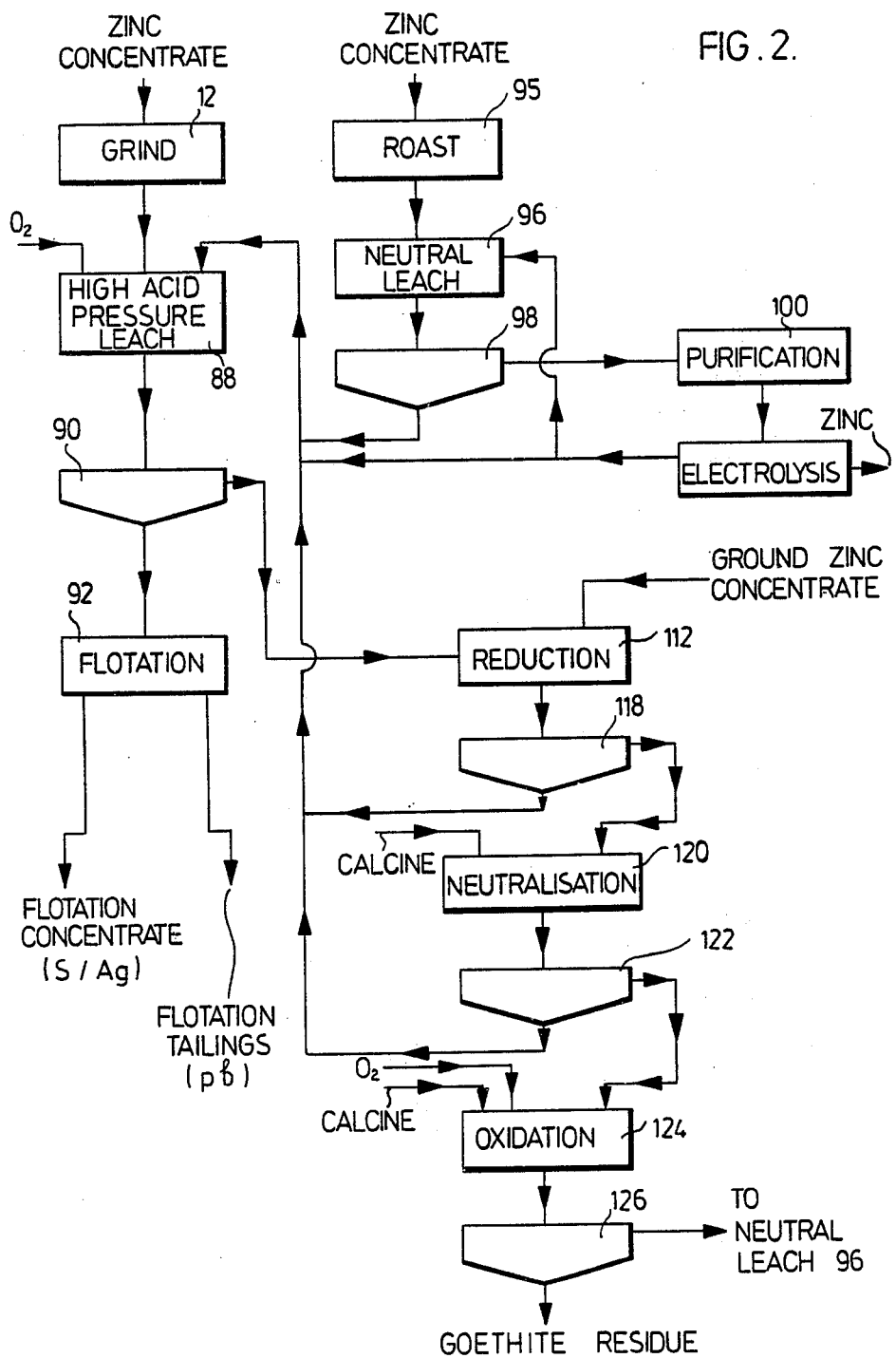
Figure 3:
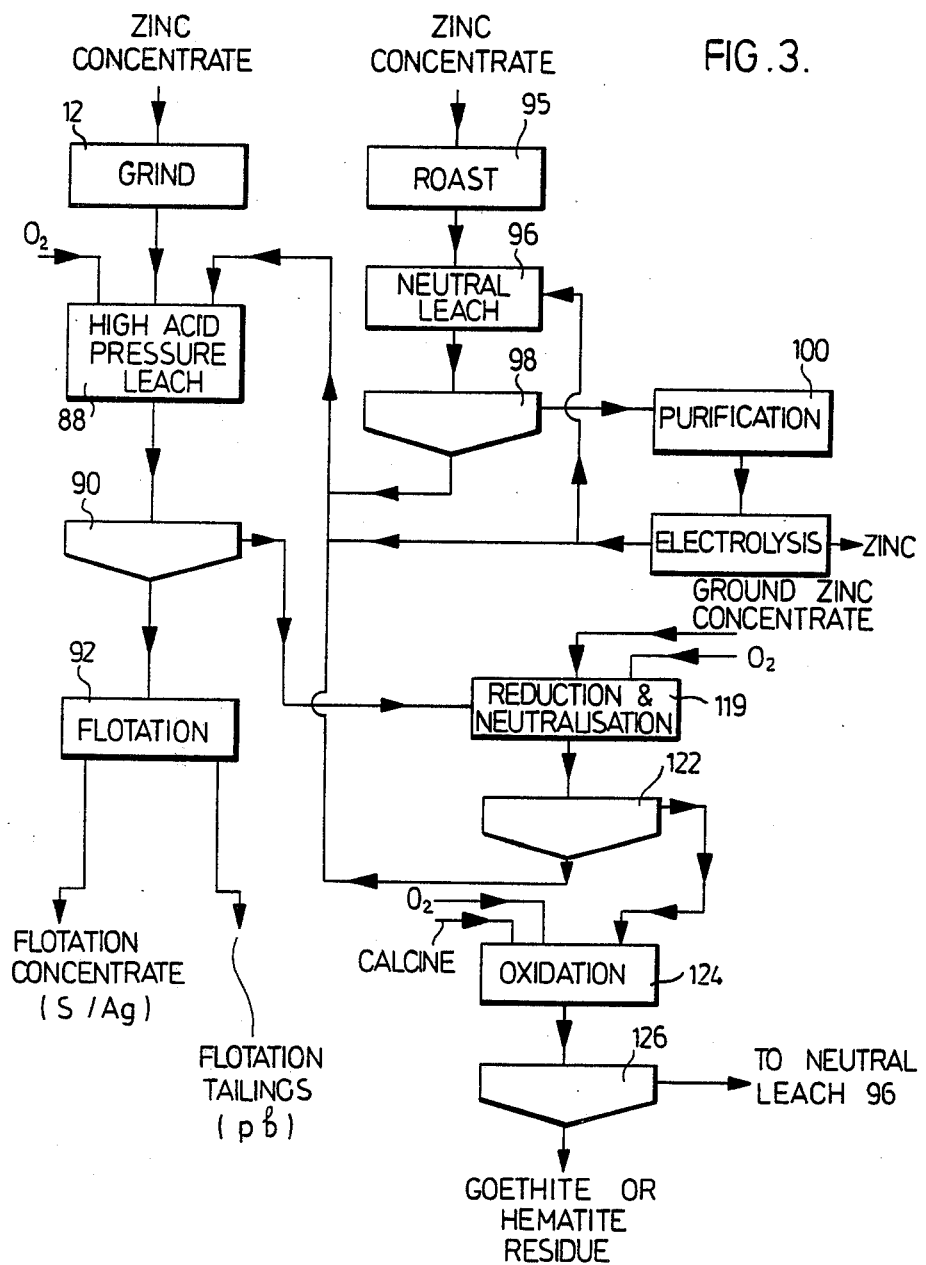
Figure 4:
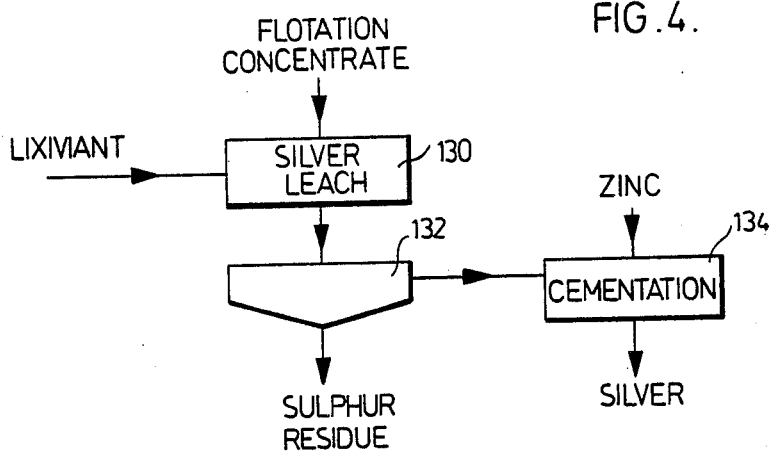
Figure 5:
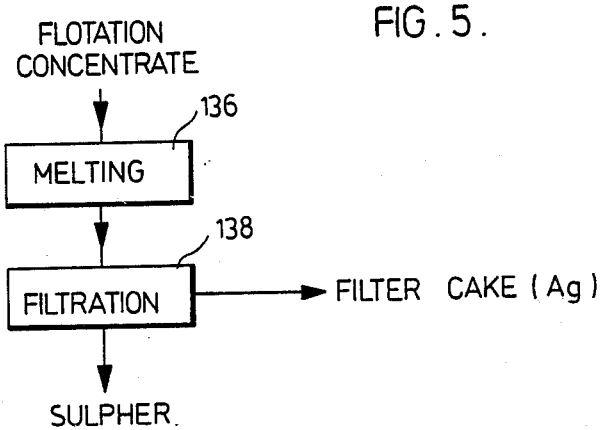

Embodiments of the invention will now be described, by way of example, with reference to the accompanying drawings of which:

FIG. 1 is a diagrammatic view of a process in which the iron-containing leach solution from the high acid leach process is utilized in another zinc process in which zinc containing sulphidic material is roasted before leaching, FIG. 2 is a similar view of another process utilizing the iron-containing leach solution in a roast-leach zinc process, FIG. 3 is a view similar to FIG. 2 in which the reduction and neutralization steps are combined, FIG. 4 is a diagrammatic view showing one manner in which the flotation concentrate from the embodiments of FIGS. 1 and 2 can be treated to separately recover elemental sulphur and silver values, and FIG. 5 is a similar view of another manner of separately recovering elemental sulphur and silver values from the flotation concentrate.

Referring first to FIG. 1 of the drawings, a process in accordance with one embodiment of the invention is used for recovering zinc, lead and silver from a zinc-containing sulphidic concentrate containing from about 40 to about 55% zinc, from about 5 to about 15% iron, from about 30 to about 35% sulphur, from about 0.5 to about 5% lead, and from about 0.001 to about 0.1% silver.

The zinc concentrate is mixed with water from a subsequent separation step, as will be described shortly, and subjected to a grinding step 12 in which the material is ground to a small size, for example over 90% less than 325 mesh. The resultant slurry is then passed to a settling tank 14 from which the overflow is recycled to the zinc concentrate being fed to the grinding step 12, and the thickened slurry underflow is fed to a high acid pressure leach step 88, the thickened slurry having a pulp density of from about 50 to about 70% solids. The grinding and separation steps 12, 14 may be omitted if satisfactory results are obtained in the leach step 88.

In the high acid pressure leach step 16, the slurry is mixed with aqueous sulphuric acid solution from a super hot acid leach step, which will be referred to later, such that there is a stoichiometric excess of sulphuric acid relative to the zinc content of the zinc concentrate in the range of from about 40 to about 100%, preferably in the range of from about 50 to about 60%. The leach step 16 is conducted under a partial oxygen pressure in the range of from about 400 to about 1000 kPa and at a temperature in the range of from about 140° to about 155° C.

The leach step 16 is continued for a period of time until over 97% of the zinc and over 95% of the iron have dissolved. The undissolved residue then contains little iron and contains substantially all the lead and silver in the original zinc concentrate.

The leach slurry is passed to a settling tank 90 from which the overflow iron-containing leach solution proceeds to a hot acid leach in a roast-leach process as will be described later. The underflow slurry is treated in a flotation step 92 to provide a flotation concentrate containing elemental sulphur, unreacted metal sulphides and silver values, and flotation tailings containing lead sulphate, minimum amounts of leach jarosite and silver.

The flotation concentrate is treated to separate elemental sulphur from silver values, such as will be described later with reference to FIGS. 4 and 5. The lead-containing flotation tailings may be treated separately for lead recovery or may be passed to a leach step in the roast-leach process which will now be described.

Zinc concentrate similar to that described in the high acid pressure leach 88 is also treated in a roast-leach process including a roast step 95 in which the concentrate is roasted at a temperature of from about 900° to 950° C. to convert the zinc sulphide content to oxide form, with some zinc ferrites also being produced. The resultant calcine is then subjected to a first stage leach 96 in which the calcine is leached in an aqueous sulphuric acid solution at a temperature of from about 60° to 80° C. to dissolve approximately 75% of the zinc oxide. The aqueous sulphuric acid solution is obtained partly from a subsequent electrolysis step, partly from a subsequent separation step and partly from a goethite precipitation step as will be described later, such that the first stage leach is conducted at a pH of about 5. Such a leach can be referred to as a neutral leach.

The leach solution is separated from undissolved residue in a settling tank 98, and is then subjected to a purification step 100 before being passed to an electrolysis step 102 where zinc is recovered. The spent solution from the electrolysis step 102 is recycled partly to the neutral leach 96, partly to a second stage leach and partly to a fourth stage leach as will be described later.

The residue from settling tank 98 is subjected to a second stage leach 104 in which the residue is leached in stronger aqueous sulphuric acid solution at a pH of about 3 to 3.5 obtained by the addition of spent solution from electrolysis step 102 and at a temperature of about the same as the neutral leach 96 to dissolve about a further 10% of the zinc oxide. Such a leach can be referred to as an acid leach. After separation in a settling tank 106, the leach solution is recycled to the neutral leach 96 and the residue is passed to a third stage leach 108.

The third stage leach 108 is supplied with the iron-containing solution from the high acid pressure leach 88 (via the separation step 90), underflow solids from a subsequent neutralization step, and a portion of leach solution from a fourth stage leach which will be described later. The lead/silver containing tailings from the flotation step 92 may also be supplied to the third stage leach 108 if desired. The third stage leach 108 is carried out at a temperature in the range of from about 80° to 90° C. and continued to a final acid concentration of from about 40 to 50 g/L. Such a leach can be referred to as a hot acid leach. The hot acid leach 108 effects dissolution of some of the zinc ferrite material formed in the roasting step 95.

The leach slurry from the hot acid leach 108 proceeds to a settling tank 110 from which the overflow leach solution passes to a reduction step 112 which will be described later, and the underflow solids pass to a fourth stage leach 114 in which the solids are leached in a portion of the spent solution from the electrolysis step 102. The fourth stage leach 114 is carried out at a temperature of from about 85° to 90° C. and a high acid concentration, which is of the order of 175 g/L, which cause further dissolution of zinc ferrite material and also dissolution of any lead jarosite or solids formed by iron hydrolysis in the high acid pressure leach 88 and present in the flotation tailings from flotation step 92. Such a leach can be referred to as a super hot acid leach.

The slurry from the super hot acid leach 114 proceeds to a settling tank 116, from which the underflow is a lead/silver residue which can be washed and subjected to a lead-silver separation process, such as a flotation process. The overflow leach solution is passed partly to the hot acid leach 108 and partly to the high acid pressure leach 88. As mentioned earlier, the overflow leach solution from the hot acid leach 108 passes to a reduction step 112. This leach solution contains iron dissolved in the high acid pressure leach 88 and in the four leach steps 96, 104, 108 and 114. In the reduction step 112, fresh ground zinc concentrate is added to reduce ferric iron to the ferrous stage. Excess zinc concentrate is used to ensure complete ferric reduction. The reduced slurry is passed to a settling tank 118, from which the underflow containing unreacted zinc concentrate and elemental sulphur solids is passed to the high acid pressure leach 88. The overflow reduced solution typically contains from about 15 to 20 g/L ferrous iron, about 40 to 50 g/L sulphuric acid and about 100 to 120 g/L zinc.

The reduced solution is then neutralized with zinc oxide calcine to about pH 1.5 in a neutralization step 120, and the resultant slurry is passed to a settling tank 122 from which underflow containing unreacted calcine is passed to the hot acid leach 108. The neutralized solution proceeds to an oxidation step 124 where air and further calcine are added to cause the precipitation of goethite, this step being carried out at a temperature of from about 50° to 100° C. and at a pH of from about 1.7 to 3. The precipitated goethite is separated from the solution in a settling tank 126 and a filtration step 128, and the remaining solution is recycled to the first stage neutral leach 96.

Thus, zinc is efficiently recovered from the zinc concentrate and the recovery of lead and silver therefrom is facilitated.

The high acid pressure liquid step 88 can also be used with relatively low grade zinc concentrates which may contain significant amounts of lead and silver. Such material could typically analyze from about 20 to about 40% zinc, from about 15 to about 25% iron, from about 30 to about 40% sulphur, from about 5 to about 15% lead and from about 0.005 to about 0.1% silver. Such materials are not suitable feeds to roast-leach plants because of the high lead and iron contents. In particular, the high iron content would result in extensive zinc ferrite formation during the roasting operation, requiring severe leaching conditions to recover the zinc. In the flowsheet shown in FIG. 1, the lead will report to the flotation tailings (from step 92) while much of the iron will report to the flotation concentrate as pyrite. Silver deportment may be somewhat different from that indicated in FIG. 1. While it is true that treatment of the material mentioned early resulted in the bulk of the silver (up to 85%) reporting to the flotation concentration (in step 92), treatment of other materials has shown that up to 70% of the silver reported to the lead sulphate flotation tailings.

Advantages can be cited for both cases. With low grade feed ("leady" zinc concentrate) to the pressure leach, silver deportment to the lead sulphate flotation tailings results in an effective separation from the pyrite. With higher grade feed, silver deportment to the flotation concentrate results in an effective separation from the lead.

The product slurry from the super hot acid leach step 114 may be passed directly to the said acid pressure leach step 88 instead of the settling tank 116 to separate the lead and silver residue derived from the calcine leaching circuit. The advantage of doing this may be enhanced silver recovery (by flotation of the pressure leach residue).

FIG. 2 shows another embodiment which is similar to that of FIG. 1 except that the acid leach, the hot acid leach and the super hot acid leach are omitted, with the residue from the settling tank 98 and the spent solution from the electrolysis step 102 being passed to the high acid pressure leach 88. Also, the iron-containing leach solution from the settling tank 90 is passed directly to the reduction step 112 instead of being initially passed to the hot acid leach 108.

In this embodiment therefore, substantially all the further calcine dissolution effected in the acid leach, the hot acid leach and the super hot acid leach of the embodiment of FIG. 1 is effected in the high acid pressure leach 88. Also, the lead/silver values in the roasted concentrate are treated in the flotation step 92 instead of appearing as a separate residue in the settling tank 116.

FIG. 3 shows a further embodiment which is similar to that of FIG. 2 except that the reduction and neutralization steps have been combined in a reduction/neutralization step 119. The leach solution is treated with an excess of ground zinc concentrate in the presence of oxygen to effect the reduction of ferric iron to ferrous iron with consumption of sulphuric acid. Also, the oxidation step 124 may be conducted to oxidize the iron to hematite as an alternative to geothite.

In the single reduction/neutralization step 119, the acid is consumed so that the amount of calcine required in the subsequent oxidation step 124 will be significantly reduced. This is important since any unleached zinc as well as lead and silver values in the calcine added to step 124 are lost to the iron residue. Lower acid concentrations in the feed to step 124 are also important if the hematite option is used since more iron can be eliminated from solution.

This modification has the important advantage that the amount of calcine required in the overall process is reduced. This is useful in the event that relatively little zinc concentrate is roasted and most zinc concentrate is directed to pressure leaching. Further to this end, the calcine requirements in the iron removal step can be eliminated with iron removal as hematite. Heating the reduced low acid solution to 150° to 200° C. under oxygen will precipitate hematite. Although iron removal is not complete because of acid generation which inhibits further precipitation beyond a temperature dependent equilibrium level, the solution returns to the neutral leach step 96 where the iron is eventually precipitated with calcine addition. The important advantage of eliminating calcine addition in the iron removal stage is that lead and silver values in the calcine will not be lost to the iron precipitate. Although an equivalent amount of calcine is required in the neutral leach step 96 to neutralize the acid and precipitate the remaining iron after hematite precipitation, the lead and silver values, as well as zinc in ferrites, are recovered because the neutral leach residue is treated in the high excess acid pressure leach stage.

FIG. 4 shows one possible manner of treating the flotation concentrate from the flotation step 92. The concentrate is leached in a leach step 130 in a silver-dissolving solvent such as $NH_4HSO_3$ or thiourea solution, with the resultant leach slurry proceeding to a settling tank 132. Ammonium bisulphite is one example of a lixiviant for silver, in step 130, since this reagent will react with elemental sulphur in the flotation concentrate to produce ammonium thiosulphate, which is an efficient lixiviant for silver extraction. Ammonia addition is required to ensure a pH of at least 8 since acid will destroy the thiosulphate. On the other hand, it has been found that a thiourea leach is best carried out under acidic conditions, for example at a pH of from about 2 to about 2.5.

The overflow silver-containing solution is treated with the zinc in a cementation step 134 to precipitate silver, and the underflow slurry is treated to recover elemental sulphur.

FIG. 5 shows another possible manner of treating the flotation concentrate from the flotation step 92. The concentrate is heated in a melting step 136 to melt the elemental sulphur, which is then filtered from the undissolved material in a filtration step 138. The silver-containing undissolved material may then be treated to recover silver, for example by leaching and/or roasting.

Examples of some of the previously described embodiments will now be described.

EXAMPLE 1

Zinc concentrate was wet-ground in a ball mill to 99% minus 325 mesh. The concentrate analysis was 49.1% Zn, 1.79% Pb, 9.75% Fe, 0.70% Cu, 32.5% S, 120 ppm (or g/t) Ag. The slurry of ground concentrates was adjusted to a pulp density of 1830 g/L (60% solids) using water. The required additives, Lignosol BD and quebracho, were added to the concentrate slurry. Synthetic super hot acid leach solution was prepared, the composition being (g/L) 53 Zn, 4.9 Fe, 2.0 Cu, and 180 $H_2SO_4$.

The pressure leaching equipment consisted of four autoclaves each of 2 to 2.5 L operating capacity connected in series. Each autoclave was equipped with agitators, thermocouple well, oxygen inlet tube and sample removal tube.

Various runs were made. In order to start each run, the autoclaves were charged with solution estimated to represent the equilibrium operating composition. The solution was heated to about 150° C. and an oxygen partial pressure of 900 kPa was applied. Concentrate slurry and synthetic super hot acid leach solution were then fed separately to the first autoclave. The feed rates were 13 to 15 mL/min slurry and 150 mL/min solution, corresponding to an excess acid level sufficient to maintain 80 to 100 g/L $H_2SO_4$ in the discharge solution.

The feed rate was such that the overall retention time in the four stage system was approximately 60 minutes. Leach conditions in all four autoclaves were identical at 150° C. and 900 kPa oxygen overpressure. Reaction slurry cascaded from autoclave #1 to #2 and so on to autoclave #4. Slurry was discharged from the final autoclave #4 at a rate set to match the incoming feed materials. The discharge slurry was collected for analysis and flotation separation of elemental sulphur.

Analysis of typical discharge slurry and overall extractions are summarized in the Table below.

TABLE

| Item | Solution Analysis (g/L) | | | | | Solids Analysis (%) | | | | | ppm |
|---|---|---|---|---|---|---|---|---|---|---|---|
| | Zn | $Fe^{2+}$ | $Fe_T$ | $H_2SO_4$ | Cu | Zn | Pb | Fe | Cu | S° | Ag |
| Feed conc. | | | | | | 49.1 | 1.79 | 9.75 | 0.70 | — | 120 |
| Feed Soln. | 53 | — | 4.9 | 180 | 2.0 | | | | | | |
| Discharge Slurry | 120–130 | 1.0 | 14–17 | 70–95 | 2.6–2.9 | 0.26 | 4.68 | 4.45 | 0.55 | 70.5 | 329 |

EXAMPLE 2

The bulk discharge slurry described above was flocculated and thickened in a continuous laboratory scale thickener. The underflow slurry was washed, the solids repulped in water to 20% solids and floated at 50° C. to separate the elemental sulphur and unreacted metal sulphides from the lead sulphate and siliceous gangue solids. Results are summarized below:

| | | Component | | | | | | |
|---|---|---|---|---|---|---|---|---|
| Item | Amount | Zn | Pb | Fe | Cu | $SiO_2$ | S° | Ag ppm |
| | | Analysis (%) | | | | | | |
| Head | 6820 g | 0.264 | 4.68 | 4.45 | 0.55 | 3.83 | 70.5 | 329 |
| Concentrate | 6095 g | 0.289 | 1.30 | 4.74 | 0.61 | 0.70 | 78.7 | 317 |
| Tailings | 725 g | 0.057 | 33.2 | 1.97 | 0.050 | 30.1 | 1.6 | 434 |
| | | Distribution (%) | | | | | | |
| Concentrate | 89.4 | 97.7 | 24.8 | 95.3 | 99.0 | 16 | 99.8 | 86.0 |
| Tailings | 10.6 | 2.3 | 75.2 | 4.7 | 1.0 | 84 | 0.2 | 14.0 |

The flotation of pressure leach residue not only recovered elemental sulphur but provided a lead/silver separation since 86% of the silver but only 25% of the lead reported to the elemental sulphur concentrate.

When the acid level in the pressure leach discharge slurry dropped to under 60 g/L as a result of higher concentrate slurry addition feed rates, lead jarosite formation occurred with the result that the lead residue (tailings) after flotation was contaminated with significant amounts of iron and the lead/silver separation was poor. An example is shown below:

| | | Component | | | | |
|---|---|---|---|---|---|---|
| Item | Amount | Zn | Pb | Fe | S° | Ag (ppm) |
| | | Analysis (%) | | | | |
| Head | 1015 g | 2.39 | 4.16 | 8.88 | 61.6 | 278 |
| Concentrate | 832 g | 2.70 | 1.21 | 6.70 | 75.0 | 144 |
| Tailings | 183 g | 0.97 | 17.6 | 18.8 | 0.9 | 889 |
| | | Distribution (%) | | | | |

-continued

| Item | Amount | Component | | | | |
|---|---|---|---|---|---|---|
| | | Zn | Pb | Fe | S° | Ag (ppm) |
| Concentrate | 82.0 | 92.7 | 23.8 | 61.9 | 99.7 | 42.5 |
| Tailings | 18.0 | 7.3 | 76.2 | 38.1 | 0.3 | 57.5 |

Zinc levels in the concentrate and tailings are higher than in the previous table because the pressure leach was conducted on unground concentrate.

Although the elemental sulphur and lead distributions in the flotation were not changed, only 42.5% of the silver reported to the flotation concentrate. In addition, the lead content of the flotation tailings was only 17.6% compared to 33.2% in the previous table, due to contamination with iron as lead jarosite. This result and additional test work confirmed that iron precipitation as lead jarosite or iron oxides prevented the flotation of silver with the elemental sulphur/metal sulphides fraction.

EXAMPLE 3

The flotation concentrate described in Example 2 above was melted at 140° to 150° C. and the melt filtered hot to produce a bright elemental sulphur filtrate and a filter cake analyzing as follows:

| Zn | Pb | Fe | Cu | $SiO_2$ | S° | $S_T$ | Ag (ppm) |
|---|---|---|---|---|---|---|---|
| ← | ← | ← | % | → | → | → | |
| 1.20 | 5.1 | 18.9 | 2.45 | 2.92 | 37.0 | 65.9 | |

EXAMPLE 4

Flotation concentrate (3.4% Zn, 1.7% Pb, 6.6% Fe, 74% S°, 274 ppm Ag) was leached in 20 g/L thiourea solution (pH about 2, adjusted with $H_2SO_4$) for 3 hours at 85° C. The resulting solids after washing and drying contained 73 ppm Ag, corresponding to 73% extraction of the silver. Grinding the flotation concentrate prior to the thiourea leach yielded a final residue containing 51 ppm Ag, corresponding to 81% extraction of the silver.

EXAMPLE 5

The reduction/neutralization of an acidic leach solution is illustrated in this example. The feed pressure leach solution analyzed (g/L): 118 Zn; 38 $H_2SO_4$; 11.5 Fe; 0.7 $Fe^{2+}$; 0.7 Cu. Zinc concentrate was added (220 g/L) and the mixture heated to 95° C. in an autoclave with agitation and 140 kPa oxygen partial pressure. Samples were withdrawn and the solution analyzed for ferrous iron, total iron, acid and zinc content.

| Time (minutes) | Solution Analysis (g/L) | | | |
|---|---|---|---|---|
| | $Fe^{2+}$ | $Fe_T$ | $H_2SO_4$ | Zn |
| Head | 0.7 | 11.5 | 38 | 118 |
| 0* | 13.8 | 14.4 | 30 | 130 |
| 10 | 13.9 | 15.3 | 23 | 140 |
| 20 | 14.2 | 16.0 | 15 | 139 |
| 30 | 13.8 | 16.3 | 7.5 | 140 |
| 40 | 13.8 | 17.4 | 3.4 | 142 |

*0-time sample was taken when the slurry reached the required temperature.

The final solution contained only 3.4 g/L acid, similar to the acid concentrations obtained in the neutralization step with calcine additions, i.e. step 120 in FIG. 2. The solution is thus suitable for the goethite precipitation and also for hematite precipitation at elevated temperatures and pressures.

As another example of the reduction/neutralization step, pressure leach solution analyzing 37 g/L $H_2SO_4$, 11.1 g/L total iron, 3 g/L ferrous iron was reduced with 224 g/L concentrate at 95° C. for 45 minutes under 140 kPa oxygen partial pressure. At the end of this period, the oxygen supply was shut off and the slurry agitated for a further 15 minutes. The resulting solution analyzed 5.6 g/L $H_2SO_4$, 14.9 g/L total iron, 14.0 g/L ferrous iron. The residue from the reduction was subjected to a pressure leaching step with synthetic electrolyte (175 g/L $H_2SO_4$, 50 g/L Zn) in an autoclave for 60 minutes at 150° C. under 700 kPa oxygen pressure. The zinc extraction was 98.7%. The product solution analysis was 37 g/L $H_2SO_4$, 11.7 g/L total iron, and 3.2 g/L ferrous iron.

Other embodiments and examples of the invention will be readily apparent to the person skilled in the art, the scope of the invention being defined in the appended claims.

What we claim as new and desire to protect by Letters Patent of the United States is:

1. A process for recovery zinc from zinc containing sulphidic material which also contains iron and at least one metal selected from the group consisting of lead and silver, the process comprising leaching the material under pressurized oxidizing conditions at a temperature in the range of from about 130° to about 170° C. in aqueous sulphuric acid solution with a stoichiometric acid excess of sulphuric acid relative to the zinc content of the material of from about 40 to 100% to produce a first residue containing a major proportion of the said at least one metal and a first leach solution containing a major proportion of the zinc and iron, separating the first residue from the first leach solution, treating the first residue to recover values of said at least one metal, roasting zinc and iron containing sulphidic material to produce a zinc oxide and zinc ferrite containing material, leaching the zinc oxide and zinc ferrite containing material in a weak aqueous sulphuric acid solution to dissolve zinc oxide and produce a leach solution containing dissolved zinc and a zinc ferrite containing second residue, separating the zinc ferrite containing second residue from the second leach solution, recovering zinc from the second leach solution, leaching the zinc ferrite containing second residue in a strong aqueous sulphuric acid solution to dissolve zinc ferrite and produce a third leach solution containing dissolved zinc and iron and a third residue, said strong aqueous sulphuric acid solution comprising at least a portion of said first leach solution containing zinc and iron, separating the third residue from the third leach solution, reducing ferric iron in the third leach solution to ferrous iron, neutralizing the solution and hydrolyzing the ferrous iron under oxidizing conditions to precipitate an iron compound, and separating the iron compound from the remaining solution.

2. A process according to claim 1 wherein the third residue contains remaining zinc ferrite and the process comprises leaching the third residue in strong aqueous sulphuric acid solution to dissolve zinc ferrite and produce a fourth residue and a zinc and iron containing fourth leach solution, and supplying at least a portion of the fourth leach solution to said leaching of said sulphidic material with a stoichiometric excess of sulphuric acid.

3. A process according to claim 1 wherein the first residue contains elemental sulphur, silver values and lead values, and the process comprises physically separating elemental sulphur and silver values from lead values.

4. A process according to claim 3 wherein the separated lead values are supplied to the leaching of the second residue in strong aqueous acid solution and report to the third residue.

5. A process for recovering zinc from zinc containing sulphidic material which also contains iron and at least one metal selected from the group consisting of lead and silver, the process comprising leaching the material under pressurized oxidizing conditions at a temperature in the range of from about 30 to about 170° C. in aqueous sulphuric acid solution with a stoichiometric acid excess of sulphuric acid relative to the zinc content of the material of from about 40 to about 100% to produce a first residue containing a major proportion of the said at least one metal and a first leach solution containing a major proportion of the zinc and iron, separating the first residue from the first leach solution, treating the first residue to recover values of said at least one metal, roasting zinc and iron containing sulphidic material to produce a zinc oxide and zinc ferrite containing material, leaching the zinc oxide and zinc ferrite containing material in a weak aqueous sulphuric acid solution to dissolve zinc oxide and produce a second leach solution containing dissolved zinc and a zinc ferrite containing second residue, separating zinc ferrite containing second residue from the second leach solution, recovering zinc from the second leach solution, supplying the zinc ferrite containing second residue to said leaching of the sulphidic material with a stoichiometric excess of sulphuric acid to cause dissolution of zinc ferrite and consequent further dissolved zinc and iron in said first leach solution, reducing ferric iron in the first leach solution to ferrous iron, neutralizing the solution and hydrolyzing the ferrous iron under oxidizing conditions to precipitate an iron compound, and separating the iron compound from the remaining solution.

6. A process according to claim 5 wherein the first residue contains elemental sulphur, silver values and lead values and the process comprises physically separating elemental sulphur and sulphur values from lead values.

* * * * *